W. WESTLAKE.

PLATFORM FOR STOVES.

No. 10,734.

Reissued June 8, 1886.

Witnesses:
Robert N. Duncan
Robt F. Gaylord

Inventor
William Westlake

N. PETERS, Photo-Lithographer, Washington, D. C.

UNITED STATES PATENT OFFICE.

WILLIAM WESTLAKE, OF BROOKLYN, NEW YORK.

PLATFORM FOR STOVES.

SPECIFICATION forming part of Reissued Letters Patent No. 10,734, dated June 8, 1886.

Original No. 119,676, dated October 3, 1871. Reissue No. 6,192, dated December 22, 1874. Application for reissue filed February 20, 1886. Serial No. 192,738.

*To all whom it may concern:*

Be it known that I, WILLIAM WESTLAKE, of the city of Brooklyn, county of Kings, and State of New York, have invented a certain new and useful Improved Zinc-Board or Platform for Stoves, of which the following is a full description, reference being had to the accompanying drawings, making a part of this specification, in which—

Figure 1:
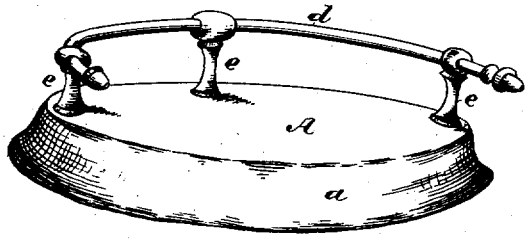
Figure 2:
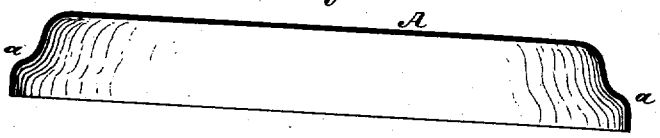
Figure 3:
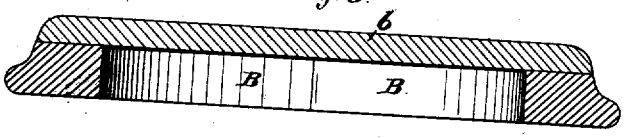
Figure 4:
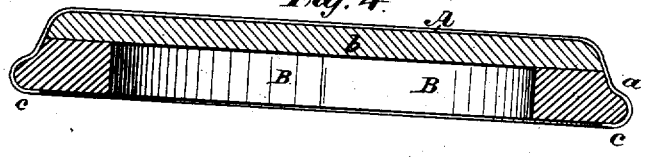
Figure 5:
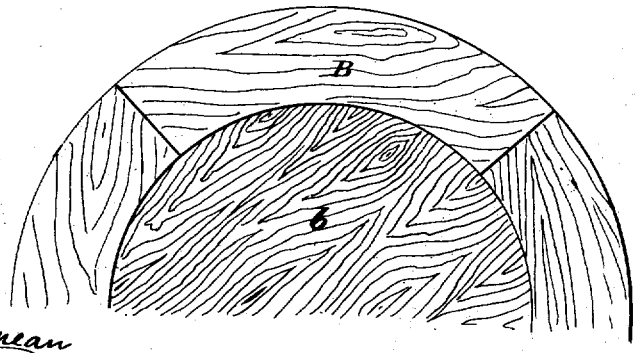

Figure 1 is a perspective; Fig. 2, a vertical section of the sheet-zinc ready to receive the wood support or interior; Fig. 3, a vertical section of the wood support or interior; Fig. 4, a vertical section of the whole; Fig. 5, an enlarged detail, showing the bottom of the wood interior.

My invention is an improvement on a zinc-board for stoves, patented to me March 21, 1871. Its objects are to furnish a more perfect support for all parts of the zinc and to provide an improved mode of securing the wooden parts in place.

In the drawings, A represents a piece of zinc, either oval or round, having an ornamental flange, *a*, about an inch and a half wide, more or less, as may be desired. This flange is at first made a little wider than the completed board, as seen in Fig. 2, so that it can be turned down over the wood support, as seen in Fig. 4 at *c*. I support the zinc by an interior of wood so formed as to fit all parts thereof, which can be most conveniently made from four pieces of wood, B, of the form shown in Fig. 5, about an inch thick, to which pieces a half-inch board or boards, *b*, must be secured, when the whole can be turned down in a lathe, giving it the desired form. This wood interior is shown in section in Fig. 3, its edge having the same shape as the flange of the zinc. The latter is shown in section in Fig. 2, ready to receive the wood portion seen in Fig. 3. After the part B *b* has been inserted within the zinc the outer edge of the flange *a* is turned down over B, holding B *b* firmly in place, as seen in Fig. 4 at *c*.

In the zinc-board patented by me March 21, 1871, the flange of the zinc and the central part of the flat portion had no support, and hence these portions were liable to be bruised. The wood supports were also secured in place by strips of metal soldered to the zinc and nailed to the wood, upon which method that herein described is an improvement, being cheaper and better. The flange *a* can be most conveniently formed by spinning, and at the same time this flange can be highly polished without any material expense. The part *c* can also be spun down over the wood. If desired, the board or a portion of it may be provided with a guard or foot-rest, *d*, placed upon or in supports *e*, as seen in Fig. 1.

What I claim as new is as follows:

1. The herein-described zinc-board for stoves, consisting of a zinc cover, A, formed into a flange, *a*, and the edge *c*, and the interior or base upon which the cover is formed, whereby the parts are firmly united and held together without the use of nails or screws and the sheet is provided with a solid bearing around the edge, as set forth.

2. The combination, in a stove-platform, of a circular or oval interior or supporting-body consisting of the pieces B *b*, with the sheet-metal exterior A, applied thereto, substantially as and for the purpose set forth.

WILLIAM WESTLAKE.

Witnesses:
ROBT. H. DUNCAN,
J. H. RAYMOND.